(12) United States Patent
Jung et al.

(10) Patent No.: US 8,467,796 B2
(45) Date of Patent: Jun. 18, 2013

(54) RADIO RESOURCE GROUP SELECTION METHOD FOR A RADIO RESOURCE MANAGEMENT

(75) Inventors: Sung-Hoon Jung, Gyeonggi-Do (KR);
Sung-Duck Chun, Gyeonggi-Do (KR);
Seung-June Yi, Gyeonggi-Do (KR);
Young-Dae Lee, Gyeonggi-Do (KR);
Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 887 days.

(21) Appl. No.: 12/606,623

(22) Filed: Oct. 27, 2009

(65) Prior Publication Data

US 2011/0098052 A1   Apr. 28, 2011
US 2012/0157107 A9   Jun. 21, 2012

Related U.S. Application Data

(60) Provisional application No. 61/108,866, filed on Oct. 27, 2008.

(30) Foreign Application Priority Data

Oct. 26, 2009  (KR) .................. 10-2009-0101948

(51) Int. Cl.
*H04W 72/04*  (2009.01)

(52) U.S. Cl.
USPC .......................................... 455/450; 370/252

(58) Field of Classification Search
USPC ................. 455/424, 450; 370/252, 312, 329, 370/330
See application file for complete search history.

(56) References Cited

U.S. PATENT DOCUMENTS

| | | |
|---|---|---|
| 2005/0111369 A1 | 5/2005 | Mangin et al. |
| 2005/0153702 A1 | 7/2005 | Cuffaro et al. |
| 2008/0212468 A1 | 9/2008 | Wigard et al. |
| 2012/0069809 A1* | 3/2012 | Aminaka et al. .............. 370/329 |

FOREIGN PATENT DOCUMENTS

WO   2008059361   5/2008

* cited by examiner

*Primary Examiner* — Sam Bhattacharya
(74) *Attorney, Agent, or Firm* — Lee, Hong, Degerman, Kang & Waimey

(57) ABSTRACT

Disclosed is the radio (wireless) communication system providing a radio communication service and the terminal, and more particularly, to a method of managing radio resource(s) using a group selection indicator so as to effectively utilize the radio resource(s) in an Evolved Universal Mobile Telecommunications System (E-UMTS) evolved from the Universal Mobile Telecommunications System (UMTS) or a Long Term Evolution (LTE) system.

9 Claims, 10 Drawing Sheets

RADIO RESOURCE GROUP SELECTION METHOD FOR A RADIO RESOURCE MANAGEMENT

CROSS-REFERENCE TO RELATED APPLICATIONS

Pursuant to 35 U.S.C. §119(a), this application claims the benefit of earlier filing date and right of priority to Korean Application No. 10-2009-0101948, filed on Oct. 26, 2009, and pursuant to 35 U.S.C. §119(e), also claims the benefit of U.S. Provisional Application Ser. No. 61/108,866, filed on Oct. 27, 2008.

TECHNICAL FIELD

The present invention relates to a radio (wireless) communication system providing a radio communication service and a terminal, and more particularly, to a method of managing radio resource(s) using a group selection indicator in an Evolved Universal Mobile Telecommunications System (E-UMTS) or a Long Term Evolution (LTE) system.

BACKGROUND ART

FIG. 1 is a view illustrating a network architecture of an Evolved Universal Terrestrial Radio Access Network (E-UTRAN), which is a mobile communication system to which the related art and the present invention are applied. The E-UTRAN system has evolved from the existing UTRAN system, and a basic standardization work thereof is currently going on in 3GPP. The E-UMTS system may be also referred to as a Long Term Evolution (LTE) system.

The E-UTRAN includes a plurality of e-NBs (e-NodeB; hereinafter, referred to as "base station"), and the plurality of eNBs are connected to one another through an X2 interface. The eNB is connected to user equipment (hereinafter, referred to as "UE") via a wireless interface, and connected to an Evolved Packet Core (EPC) through an S1 interface.

The EPC may include a Mobility Management Entity (MME), a Serving-Gateway (S-GW), and a Packet Data Network-Gateway (PDN-GW). The MME has information on the connection of UE or the capability of UE, and such information is primarily used for the mobility management of the UE. The S-GW is a gateway having E-UTRAN as an end point, and the PDN-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (hereinafter, referred to as "RRC") layer located at the third layer plays a role of controlling radio resources between UE and a network. For the purpose of this, the RRC layer exchanges RRC messages between UE and a network.

FIGS. 2 and 3 are views illustrating an architecture of a radio interface protocol between UE and a base station based on the 3GPP radio access network standard. The radio interface protocol horizontally includes a physical layer, a data link layer, and a network layer, and vertically divided into a user plane (U-plane) for transmitting data information and a control plane (C-plane) for transferring a control signaling. The protocol layers of FIGS. 2 and 3 can be divided into a first layer (L1), a second layer (L2) and a third layer (L3) based on three lower layers of an Open System Interconnection (OSI) reference model widely known in communications systems. Those radio protocol layers exist as a pair in the UE and the E-UTRAN to perform a data transmission for the radio section.

Hereinafter, each layer in a radio protocol control plane of FIG. 2 and a radio protocol user plane of FIG. 3 will be described.

The first layer as a physical layer provides an information transfer service to an upper layer using a physical channel. The physical layer is connected to its upper layer, called a Medium Access Control (MAC) layer, via a transport channel, and data is transferred between the MAC layer and the physical layer via the transport channel. Furthermore, data is transferred via a physical channel between different physical layers, in other words, between the physical layer of a transmitting side and the physical layer of a receiving side. The physical channel is modulated by an Orthogonal Frequency Division Multiplexing (OFDM) scheme and time and frequency are used as radio resources for the channel.

The Medium Access Control (hereinafter, referred to as "MAC") layer located at the second layer provides a service to its upper layer, called a Radio Link Control (hereinafter, referred to as "RLC") layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer is used to efficiently transmit IP packets, such as IPv4 or IPv6, in the radio section having a relatively small bandwidth. For this purpose, the PDCP layer performs a header compression function for reducing the size of an IP packet header, which is relatively large in size and includes unnecessary control information.

A Radio Resource Control (hereinafter, referred to as "RRC") layer located at the uppermost portion of the third layer is only defined in the control plane. The RRC layer takes charge of controlling logical channels, transport channels and physical channels in relation to the configuration, re-configuration and release of Radio Bearers (RBs). Here, the RB denotes a service provided by the second layer to perform a data transmission between the UE and the UTRAN. If an RRC connection is established between a RRC layer of the UE and a RRC layer of the UTRAN, then the UE is in an RRC_CONNECTED state. Otherwise, the UE is in an RRC_IDLE state.

Downlink transport channels for transmitting data from a network to UE may include a Broadcast Channel (BCH) for transmitting system information, and a downlink Shared Channel (SCH) for transmitting other user traffic or control messages. In case of traffic or control messages of a downlink multicast or broadcast service, they may be transmitted either via a downlink SCH, or via a separate downlink Multicast Channel (MCH). On the other hand, uplink transport channels for transmitting data from UE to a network may include a Random Access Channel (RACH) for transmitting an initial control message and an uplink Shared Channel (SCH) for transmitting user traffic or control messages.

Logical channels which are located at an upper level of transport channels and mapped to the transport channels may include a Broadcast Control Channel (BCCH), a Paging Control Channel (PCCH), a Common Control Channel (CCCH), a Multicast Control Channel (MCCH), a Multicast Traffic Channel (MTCH), and the like.

A physical channel includes multiple sub-frames arranged on a time axis and multiple sub-carriers arranged on a frequency axis. Here, a sub-frame includes a plurality of symbols on the time axis. A sub-frame includes a plurality of resource blocks each including a plurality of symbols and a plurality of sub-carriers. Also, each sub-frame can use particular sub-carriers of particular symbols (e.g., a first symbol) in the relevant sub-frame for a Physical Downlink Control Channel (PDCCH), that is, a L1/L2 control channel. A sub-frame has a time duration of 0.5 ms. A Transmission Time Interval (TTI) as a unit time for transmitting data is 1 ms, corresponding to two sub-frames.

Hereinafter, an RRC state and an RRC connection method of UE will be described in detail. The RRC state refers to whether or not the RRC of the UE is logically connected to the RRC of an E-UTRAN. If connected, then it is called an RRC_CONNECTED state, and otherwise it is called an TTC_IDLE state. For the UE in an RRC_CONNECTED state, the E-UTRAN can recognize the existence of the relevant UE in a cell unit because there exists an RRC connection thereof, and thus the E-UTRAN can effectively control the UE. On the contrary, for the UE in RRC_IDLE state, the E-UTRAN cannot recognize the relevant UE, and therefore, it is managed by a core network in a tracking area unit, which is a unit larger than a cell. In other words, the existence of the UE in an RRC_IDLE state is only recognized in a large area unit, and therefore, it should be changed to an RRC_CONNECTED state in order to receive typical mobile communication services such as voice or data.

When the UE is initially turned on by a user, the UE first searches for a suitable cell and then is camped in an RRC_IDLE state in the relevant cell. The UE camped in an RRC_IDLE state makes an RRC connection with the RRC of the E-UTRAN through an RRC connection procedure when it is required to make an RRC connection, thereby changing the state to an RRC_CONNECTED state. There are several cases when the UE in an idle state is required to make an RRC connection. For example, an uplink data transmission may be required due to a phone call attempt by the user, or the like, or the transmission of a response message may be required in response to a paging message received from the E-UTRAN.

The Non-Access Stratum (NAS) layer located at an upper level of the RRC performs a function such as session management, mobility management, and the like.

In order to manage the mobility of the UE at the NAS layer, both an EPS Mobility Management-REGISTERED (EMM-REGISTERED) state and an EMM-DEREGISTERED state are defined, and both states will be applied to the UE and a Mobility Management Entity (MME). The UE is initially in an EMM-DEREGISTERED state, and carries out a process of registering it into the relevant network through an 'Initial Attach' procedure in order to access a network. If this 'Attach' procedure has been successfully carried out, then the UE and the MME will be in an EMM-REGISTERED state.

In order to manage a signaling connection between the UE and the EPC, both an EPS Connection Management (ECM)-IDLE state and an ECM-CONNECTED state are defined, and the both states will be applied to the UE and the MME. If the UE in an ECM-IDLE state makes an RRC connection with E-UTRAN, then it will be in an ECM-CONNECTED state. If the MME in an ECM-IDLE state makes an S1 connection with E-UTRAN, then it will be in an ECM-CONNECTED state. When the UE is in an ECM-IDLE state, the E-UTRAN has no context information of the UE. Therefore, the UE in an ECM-IDLE state carries out a UE-based mobility procedure such as a cell selection or reselection without receiving a command from the network. On the contrary, when the UE is in an ECM-CONNECTED state, the mobility of the UE is managed by a command of the network. If the location of the UE in an ECM-IDLE state is changed from the location that has been recognized by the network, the UE performs a Tracking Area Update procedure to notify the network of the relevant location of the UE.

Next, system information will be described. The system information includes essential information for the UE to know in order to access a base station. Therefore, the UE should have received all of the system information prior to accessing the base station, and also should have the latest system information all the time. Furthermore, the base station periodically transmits the system information because the system information should be notified to every UE in a cell.

The system information can be divided into MIB, SB, SIB, and the like. The Master Information Block (MIB) allows the UE to be notified of a physical architecture of the relevant cell, for example, a bandwidth, and the like. The Scheduling Block (SB) notifies of the transmission information of SIBs, for example, transmission period, and the like. The System Information Block (SIB) is a set of mutually-related system information. For example, a certain SIB includes only the information of neighboring cells, and another certain SIB includes only the information of uplink radio channels used by the UE.

In the related art, a plurality of radio resources is divided into a plurality of radio resource groups for each specific purpose (i.e., intend of use) such that a terminal can use a radio resource of a corresponding radio resource group that assigned only for the specific purpose of the terminal. In order to achieve this, the terminal and a network must make a rule how to divide the plurality of radio resources, and the network transmits one or more parameters, which will be applied to this rule, to the terminal so as to properly divide the plurality of radio resources. However, in the related art, such dividing rule for the radio resources and each specific purpose of the plurality of radio resource groups are fixed throughout rest operations between the terminal and network. Such un-flexible radio resources assignment or allocation causes a great drawback for managing the radio resources in effective manner.

DISCLOSURE OF THE INVENTION

Therefore, an object of the present invention is to effectively manage radio resources in a wireless communication system.

To achieve this and other advantages and in accordance with the purpose of the present invention, as embodied and broadly described herein, there is provided a method of managing a radio resource in wireless communication system, the method comprising: receiving a grouping parameter and a group selection indicator from a network, wherein the grouping parameter is used to form radio resource groups; selecting at least one radio resource group among the radio resource groups based on the group selection indicator; selecting at least one radio resource from the at least one selected radio resource group; and accessing the network using the at least one selected radio resource or performing a measurement for a cell having the at least one selected radio resource.

To achieve this and other advantages and in accordance with the purpose of the present invention, as embodied and broadly described herein, there is also provided a method of managing a radio resource in wireless communication system, the method comprising: receiving a grouping parameter and a group selection indicator from a network, wherein the grouping parameter is used for grouping radio resources; and grouping radio resources into at least a first radio resource group and a second radio resource group based on the grouping parameter, wherein the first radio resource group is used to allocate radio resources for at least a first purpose and the second radio resource group is used to allocate radio resources for at least a second purpose that is different from the first purpose, and wherein the group selection indicator allows the first radio resource group to be used to allocate the radio resources for the second purpose and allows the second radio resource group to be used to allocate the radio resources for the first purpose.

Also, to achieve this and other advantages and in accordance with the purpose of the present invention, as embodied and broadly described herein, there is provided a method of managing a radio resource in wireless communication system, the method comprising: generating a grouping parameter and a group selection indicator, wherein the grouping parameter is used to form radio resource groups; and transmitting the grouping parameter and group selection indicator to a terminal, wherein the group selection indicator is used to select a radio resource group among the radio resource groups, wherein at least one radio resource is selected from the radio resource group, and wherein the selected at least one radio resource is used for communicating with the terminal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In general, network services provided to UE can be divided into three types as follows. Furthermore, the UE may recognize the type of a cell differently based on which service can be received. First, the type of services will be described, and then the type of a cell will be described below.

1) Limited service: This service provides an emergency call and an earthquake and tsunami warning system (ETWS), and may be provided in an acceptable cell.

2) Normal service: This service denotes a public use with general purposes, and may be provided in a suitable or normal cell.

3) Operator service: This service denotes a service for communication network service providers, and this cell can be only used by communication network service providers but cannot be used by typical users.

With regard to the service types provided by a cell, the type of a cell can be divided as follows.

1) Acceptable cell: A cell in which the UE can receive a limited service. This cell is not barred and satisfies the cell selection criteria of the UE from a standpoint of the relevant UE.

2) Suitable cell: A cell in which the UE can receive a normal service. This cell satisfies the condition of an acceptable cell, and at the same time satisfies additional conditions. For additional conditions, the cell should be attached to PLMN to which the relevant UE can be accessed, and it should be a cell in which the implementation of a tracking area update procedure by the UE is not barred. If the relevant cell is a CSG cell, then it should be a cell that can be accessed by the UE as a CSG member.

3) Barred cell: A cell broadcasting information that it is a barred cell through the system information.

4) Reserved cell: A cell broadcasting that it is a reserved cell through the system information.

Figure 1:
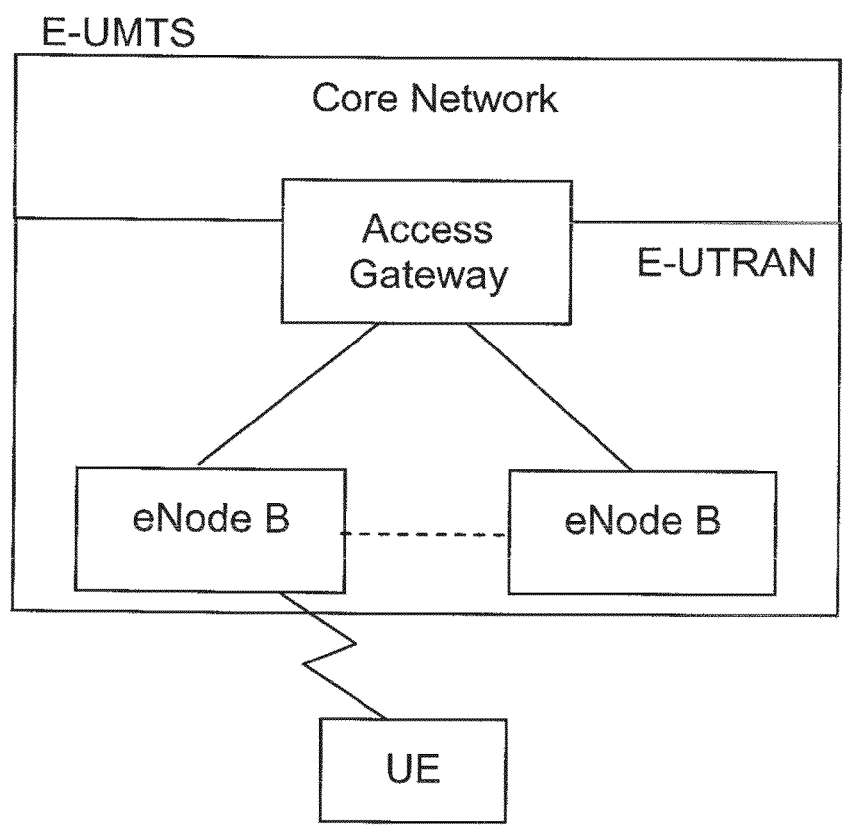
FIG. 1 shows an exemplary network structure of an Evolved Universal Mobile Telecommunications System (E-UMTS) as a mobile communication system to which a related art and the present invention are applied.
Figure 2:
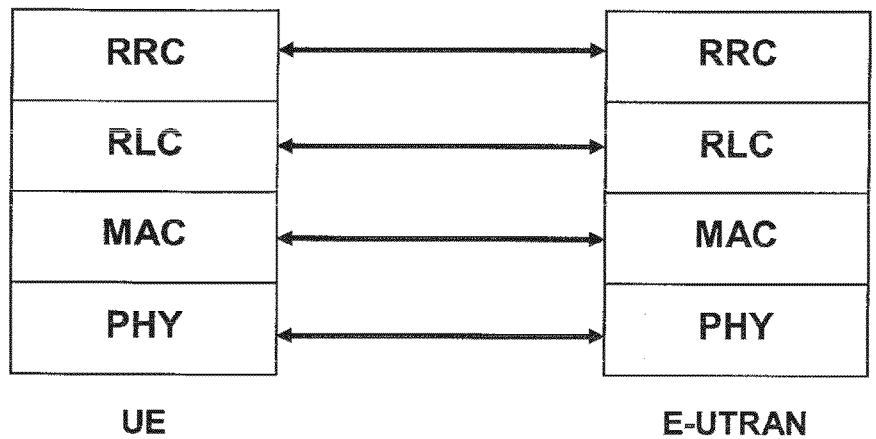
FIG. 2 shows an exemplary view of related art control plane architecture of a radio interface protocol between a terminal and an E-UTRAN.
Figure 3:
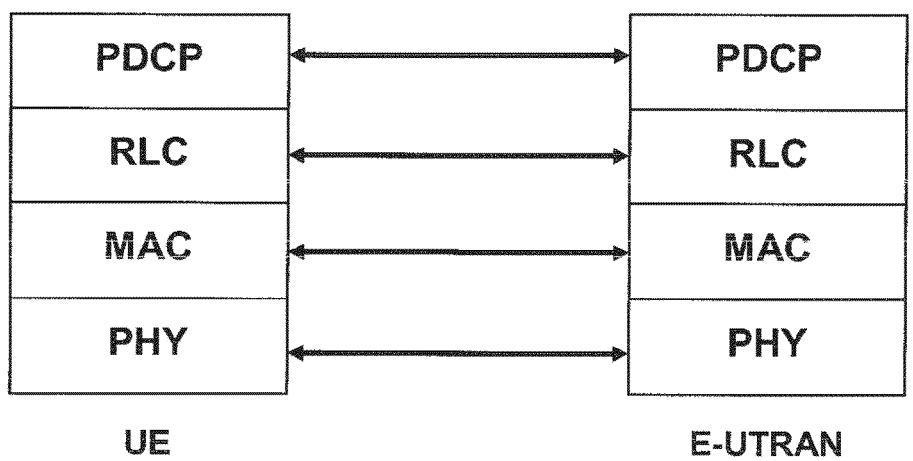
FIG. 3 shows an exemplary view of related art user plane architecture of a radio interface protocol between a terminal and an E-UTRAN.
Figure 4:
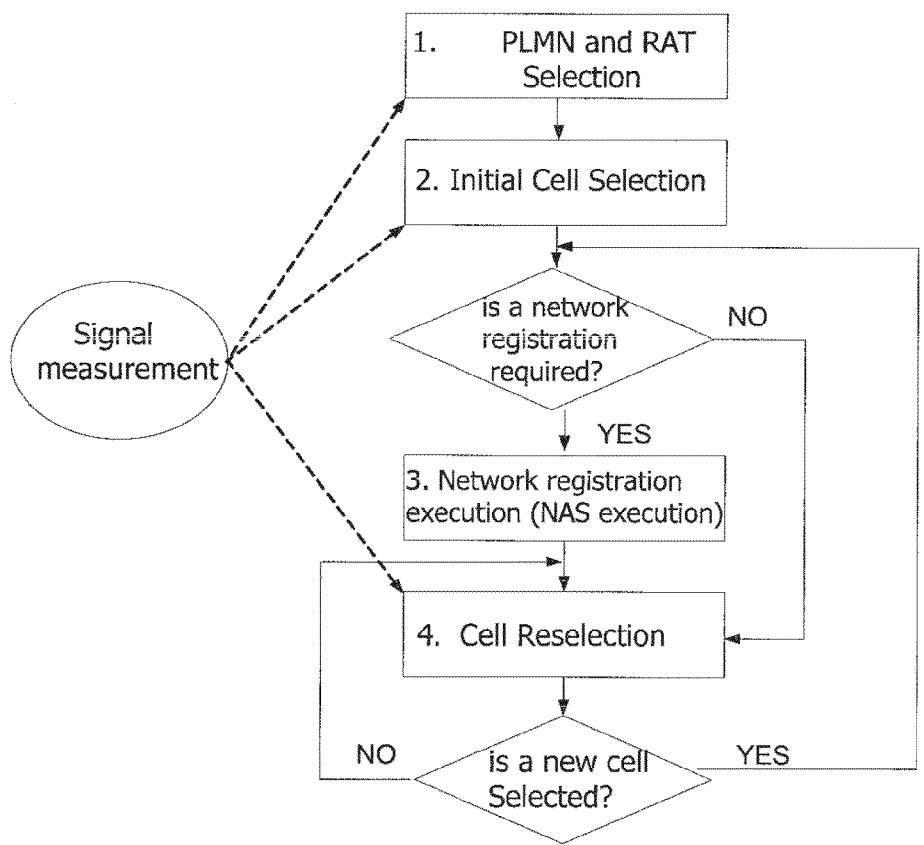
FIG. 4 is an exemplary view illustrating a procedure for the operation of UE selecting a cell in the idle mode.

FIG. 4 is an exemplary view illustrating the operation of UE selecting a cell in the idle mode.

In the first step, the UE selects a Radio Access Technology (hereinafter, referred to as "RAT") for communicating with a Public Land Mobile Network (hereinafter, referred to as "PLMN") from which the UE itself desires to receive a service. The information of PLMN and RAT may be selected by the user of the UE, and what is stored in the USIM may be also used.

In the second step, the UE selects a cell having the largest value among the cells that the measured base station has a value greater than a particular value in the signal intensity and quality (cell selection). Then, it receives SI being sent by the base station. The particular value denotes a value defined by a system to guarantee the quality of physical signals in the data transmission and/or reception. Accordingly, the value may vary based on the RAT to be applied.

In the third step, the UE registers its own information (for example, IMSI) for receiving a service (for example, paging) from a network. Here, the UE is not registered into a network to be accessed whenever selecting a cell but registered into a network in case when network information received from SI (for example, Tracking Area Identity (TAI)) is different from network information that the UE itself knows.

In the fourth step, if a value of the signal intensity and quality measured by the base station from which the UE receives a service is less than a value measured by the base station of the neighboring cell, then the UE selects one of the other cells providing signals having better characteristics than those of the cell of the base station being accessed by the UE. This process is called a cell reselection to distinguish it from an initial cell selection in the second step. At this time, a time restriction condition may be specified in order to prevent a cell from being frequently reselected based on the change of the signal characteristics.

Next, a procedure for selecting a cell by the UE will be described in detail. If the UE is turned on, then the UE should perform preparation procedures for selecting a cell having a suitable quality in order to receive a service.

The UE in a RRC_IDLE state should select a cell having a suitable quality all the time, and thus be prepared to receive a service through the cell. For example, the UE that has been just turned on should select a cell having a suitable quality to be registered into a network. If the UE that has been in a RRC_CONNECTED state enters into an RRC_IDLE state, then the UE should select a cell in which the UE itself is camped on. In this manner, a process of selecting a cell satisfying a predetermined condition by the UE in order to be camped in a service waiting state such as the RRC_IDLE state, is called a cell selection. The cell selection is performed in a state that the UE does not currently determine a cell in which the UE itself is camped in the RRC_IDLE state, and thus it is very important to select the cell as quickly as possible. Therefore, if it is a cell providing a radio signal quality greater than a predetermined level, then it may be selected during a cell selection process by the UE even though the cell is not a cell providing best radio signal quality.

Hereinafter, a method and procedure for selecting a cell by LTE UE will be described in detail. If power is initially turned on, the UE searches for available PLMNs and selects a suitable PLMN to receive a service. Subsequently, the UE selects a cell having a signal quality and characteristic capable of receiving a suitable service among the cells being provided by the selected PLMN. Here, the cell selection process can be largely divided into two types. One type is an initial cell selection process, and in this process, the UE does not have previous information on radio channels. Therefore, the UE searches for all the radio channels to find a suitable cell. In each channel, the UE searches for the strongest cell. Subsequently, if a suitable cell satisfying the cell selection criteria is found, then the UE selects the relevant cell. The other type is a cell selection process using the stored information, and in this process, the UE uses information on radio channel stored in the UE, or selects a cell by using information being broadcasted from the cell. Accordingly, a cell may be quickly selected compared to an initial cell selection process. If a cell satisfying the cell selection criteria is found, then the UE selects the relevant cell. If a cell satisfying the cell selection criteria is not found, then the UE performs an initial cell selection process.

The cell selection criteria used by the UE in the cell selection process may be represented by the formula in the following Table 1.

TABLE 1

Criteria for selecting a cell by the UE in LTE.

Cell selection criteria: Srxlev > 0
Here, Srxlev = $Q_{rxlevmeas} - (Q_{rxlevmin} + Q_{rxlevminoffset})$ − Pcompensation The parameters used in the above cell selection criteria are as follows.
$Q_{rxlevmeas}$ Measured cell received level (RSRP)
$Q_{rxlevmin}$ Minimum required received level in the cell (dBm)
$Q_{rxlevminoffset}$ Offset to $Q_{rxlevmin}$ (offset)
Pcompensation max($P_{EMAX} - P_{UMAX}$, 0) (dB)
$P_{EMAX}$ Maximum transmission power allowed for the UE in the relevant cell (dBm)
$P_{UMAX}$ Maximum transmission power of the UE radio transmission unit (RF) based on the performance of the UE (dBm)

In the above Table 1, it may be seen that UE selects a cell having a value of the measured signal intensity and quality greater than a particular value specified by the cell providing a service. Furthermore, the parameters used in the above Table 1 may be broadcasted via the system information, and the UE receives those parameter values to use them for the cell selection criteria.

If the UE selects a cell satisfying the cell selection criteria, then the UE receives the information required for the RRC_IDLE mode operation of the UE in the relevant cell from the system information of the relevant cell. The UE receives all the information required for the RRC_IDLE mode operation, and then waits in an idle mode to request a service (for example, originating call) to a network or receive a service (for example, terminating call) from a network.

After the UE selects a certain cell via a cell selection process, the signal intensity and quality between the UE and the base station may be changed due to the change of the UE mobility and wireless environment. Therefore, if the quality of the selected cell is deteriorated, then the UE may select another cell providing better quality. In this manner, if a cell is reselected, then a cell providing signal quality better than that of a currently selected cell is typically selected. This process is called a cell reselection. A basic object of the cell reselection process is typically to select a cell providing best quality to the UE from a standpoint of the radio signal quality. In addition to the standpoint of the radio signal quality, the network may notify the UE of its priority by determining it for each frequency. The UE that has received the priority may consider this priority in the first place than the radio signal quality criteria during the cell reselection process.

As described above, there is a method of selecting or reselecting a cell based on the signal characteristics of wireless environment. When reselecting a cell, in selecting a cell for the reselection, there may be cell reselection methods as described below, based on the radio access technology (hereinafter, referred to as "RAT") and frequency characteristics of a cell.

Intra-frequency reselection: A cell having a center-frequency similar to the RAT similar to the cell currently being used by the UE is reselected.

Inter-frequency reselection: A cell having a center-frequency different from the RAT similar to the cell currently being used by the UE is reselected.

Inter-REAT cell reselection: A cell using a different RAT from the RAT currently being used by the UE is reselected.

On the other hand, 3G or Evolved Packet System (EPS) services may be provided via a base station owned by a private person, particular service provider, or group in addition to a mobile communication service provider. Such a base station is called a Home Node B (HNB) or Home eNB (HeNB). Hereinafter, both the HNB and HeNB are commonly designated as a H(e)NB. An object of the H(e)NB is basically to provide specialized services only to a Closed Subscriber Group (CSG). However, those services may be provided to other users in addition to the CSG based on the operation mode setting of the H(e)NB.

Figure 5:
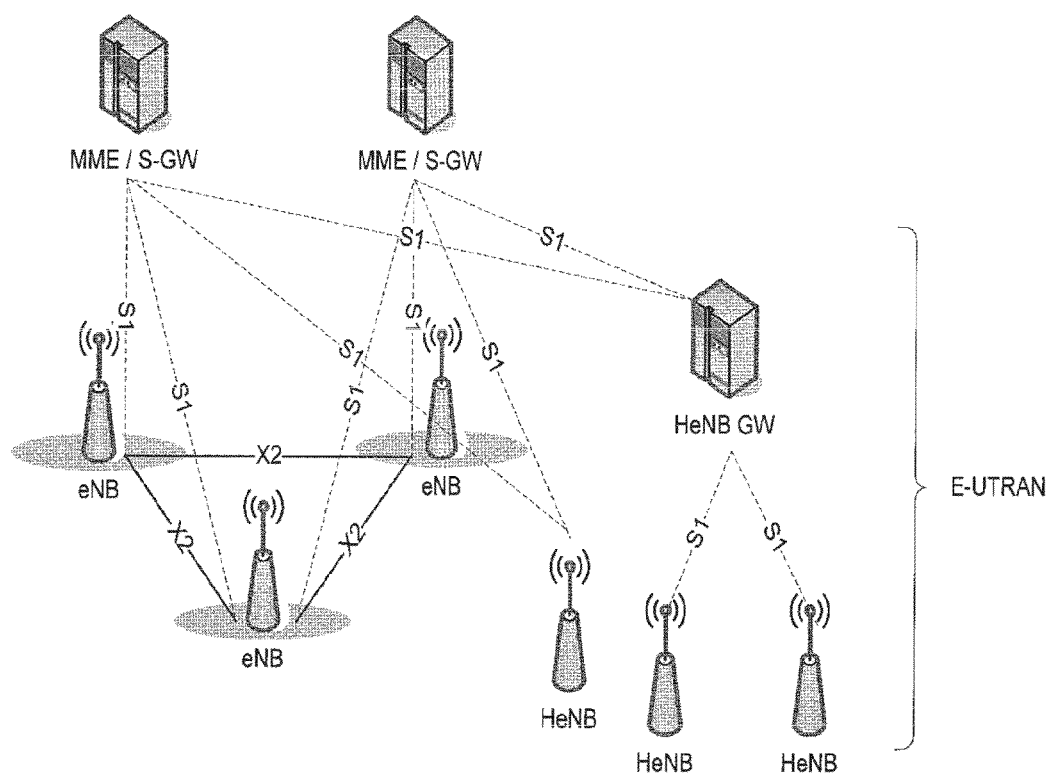
FIG. 5 is an exemplary view illustrating a network architecture of E-UTRAN for managing H(e)NB by using an H(e)NB gateway (GW)

FIG. 5 is an exemplary view illustrating a network architecture of E-UTRAN for managing an H(e)NB by using an H(e)NB gateway (GW).

As illustrated in FIG. 5, HeNBs may be connected to EPC via HeNB GW or directly connected to EPC. Here, the HeNB GW is regarded as a typical eNB to MME. Also, the HeNB GW is regarded as the MME to the HeNB. Therefore, an Si interface is connected between HeNB and HeNB GW, and also an Si interface is connected between the HeNB GW and the EPC. Furthermore, even in case of directly connecting between HeNB and EPC, it is connected via an Si interface. The function of HeNB is almost similar to the function of a typical eNB.

In general, H(e)NB has a low radio transmission output power compared to (e)NB owned by mobile communication service providers. Therefore, the service coverage provided by H(e)NB is typically smaller than the service coverage provided by (e)NB. Due to such characteristics, the cell provided by H(e)NB is classified as a femto cell in contrast to a macro cell provided by (e)NB from a standpoint of the service coverage. On the other hand, from a standpoint of provided services, when H(e)NB provides those services only to a CSG group, the cell provided by this H(e)NB is referred to as a CSG cell.

Each CSG has its own identification number, and this identification number is called a CSG ID (CSG identity). The UE may have a CSG list to which the UE itself belongs as a member thereof, and this CSG list may be changed by a request of the UE or a command of the network. Typically, one H(e)NB may support one CSG.

H(e)NB delivers the CSG ID of the CSG being supported by itself through the system information, thereby allowing only the relevant CSG member UE to be accessed. When a CSG cell is found by the UE, what type of CSG being supported by this CSG cell can be checked by reading the CSG ID included in the system information. The UE that has read the CSG ID regards the relevant cell as an accessible cell only if the UE itself is a member of the relevant CSG cell.

It is not always required for H(e)NB to allow only the CSG UE to be accessed. Based on the configuration setting of H(e)NB, non-CSG member UE may be allowed to be accessed. The type of UE allowed to be accessed may be changed based on the configuration setting of H(e)NB. Here, the configuration setting denotes the setting of the operation mode of H(e)NB.

The operation mode of H(e)NB can be divided into three types as follows based on the type of UE.

1) Closed access mode: A mode in which services are provided to particular CSG members only. A CSG cell is provided by H(e)NB.

2) Open access mode: A mode in which services are provided without any restriction of particular CSG members like typical (e)NB.

3) Hybrid access mode: A mode in which CSG services are provided to particular CSG members and also services are provided to non-CSG members like a typical cell. It is recognized as a CSG cell for the CSG member UE, and recognized as a typical cell for the non-CSG member UE. This cell is called a hybrid cell.

H(e)NB notifies the UE that the cell being serviced by itself is a CSG cell or typical cell, allowing the UE to know whether or not it can be accessed to the relevant cell. H(e)NB being managed in a closed access mode broadcasts via the system information that it is a CSG cell. In this manner, H(e)NB allows the system information to include an one-bit CSG indicator indicating whether or not the cell being serviced by itself is a CSG cell in the system information. For example, the CSG cell broadcasts by setting the CSG indicator to TRUE. If the cell being serviced is not a CSG cell, then it may be used a method that the CSG indicator may be set to FALSE or the transmission of the CSG indicator is omitted.

In general, CSG cells and macro cells may be concurrently managed at a particular frequency. This frequency is called a mixed carrier frequency. The network may reserve particular physical layer CSG identities in a mixed carrier frequency for CSG cells. The physical layer CSG identity is called a Physical Cell Identity (PCI) in E-UTRAN, and called a Physical Scrambling Code (PSC) in UTRAN. For the sake of convenience of explanation, the physical layer CSG identity will be expressed by PCI. In a mixed carrier frequency, the CSG cell notifies information on the PCIS reserved for CSG at a current frequency via the system information. The UE received this information can determine whether or not this cell is a CSG cell from the PCI of the cell when a certain cell is found at the relevant frequency. How this information being used by the UE will be illustrated below in case of two types of UE.

First, in case of the UE, not supporting the CSG-related function or having no CSG list to which the UE itself belongs, the UE does not need to regard a CSG cell as a selectable cell during the cell selection/reselection process. In this case, the UE checks only the PCI of the cell, and then the UE may immediately eliminate the relevant cell during the cell selection/reselection process if the PCI is a reserved PCI for CSG. Typically, the PCI of a certain cell may be immediately known during a process of checking the existence of the relevant cell in a physical layer by the UE.

Second, in case of the UE having a CSG list to which the UE itself belongs, when the UE wants to know a list of the neighboring CSG cells at a mixed carrier frequency it may be known that the relevant cell is a CSG cell if only a cell having the PCI reserved for CSG is found, instead of individually checking the CSG identity of the system information of every cell found in the whole PCI range.

The network may transmit information relating to a PCI purpose to the UE in order to notify the UE that which PCI is reserved for the CSG cell and/or which PCI is reserved for the non-CSG cell. This may be called as a PCI group signaling.

Figure 6:
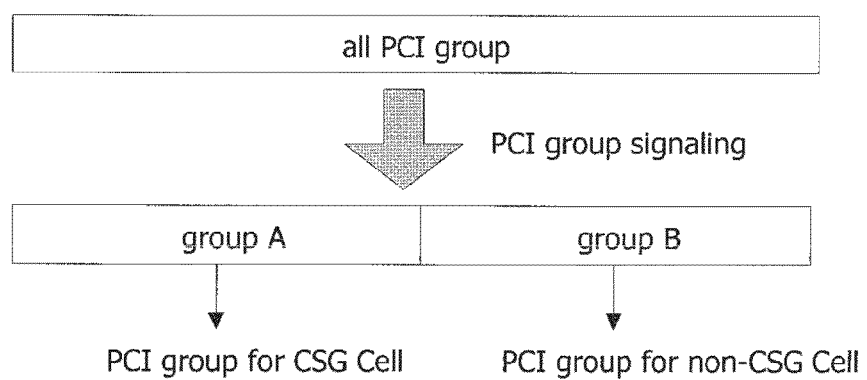
FIG. 6 is an exemplary view of dividing a physical cell identity (PCI) group into two different physical cell identity (PCI) groups by applying a PCI group signaling.

FIG. 6 is an exemplary view of dividing a physical cell identity (PCI) group into two different physical cell identity (PCI) groups by applying a PCI group signaling.

As illustrated in FIG. 6, all PCI group can be divided into two different groups by the PCI group signaling. Here, the PCI group signaling may be performed by transmitting a boundary PCI of the two groups from the network to the UE such that the all PCI group can be divided into the two groups. For example, the network may transmit 'X' value, which is greater than or equal to 'N', to the UE. Upon or after receiving the 'X' value, the UE may consider any PCI grater or equal to 'X' as a 'group B'. Then, the PCI group for CSG cell is defined as any PCI group other than 'group B', which is a 'group A'.

In order to perform the PCI group signaling, the network and UE have to know a specific rule how the PCI groups are divided. Further, a purpose of each divided PCI group is predefined between the UE and the network. For example, as illustrated in FIG. 6, the PCI included in the 'group A' is always used for the CSG cell, and the PCI included in the 'group B' is always used for the non-CSG cell. Here, the purpose of each group can not be changed. Namely, the PCI included in the 'group A' can not possibly be used for the non-CSG cell, and the PCI included in the 'group B' can not possibly be used for the CSG cell. Therefore, during a cell planning, even if the network wishes to assign 'group B' as a PCI group for CSG cell, such radio resource assignment is not possible.

Namely, in addition to the group signaling scheme, the present disclosure proposes to utilize a group selection indicator such that the network may flexibly select or change a purpose of each radio resource group. Here, the radio resource may be a physical layer identity such as a Physical Cell Identity (PCI) in LTE and a Physical Scrambling Code (PSC) in UMTS. Further, the radio resource may be a radio resource of a MAC layer (e.g., random access preamble, etc) or a RRC layer (e.g., cell identity, etc). The group selection indicator may include information regarding a purpose of each radio resource group. The group selection indicator may be transmitted to the UE per each group, or the group selection indicator may be transmitted to only a partial group. The group selection indicator may not be included in a certain group, in this case, a default purpose will be applied for the certain group.

As described above, one of the group signaling scheme may be performed by transmitting a boundary value of two different radio resource groups. Further, a starting point value of a radio resource group and a total number of radio resource groups may be transmitted to the UE, thereby dividing radio resource(s) into a plurality of radio resource groups. Here, the plurality of radio resource may be more than two.

Figure 7:
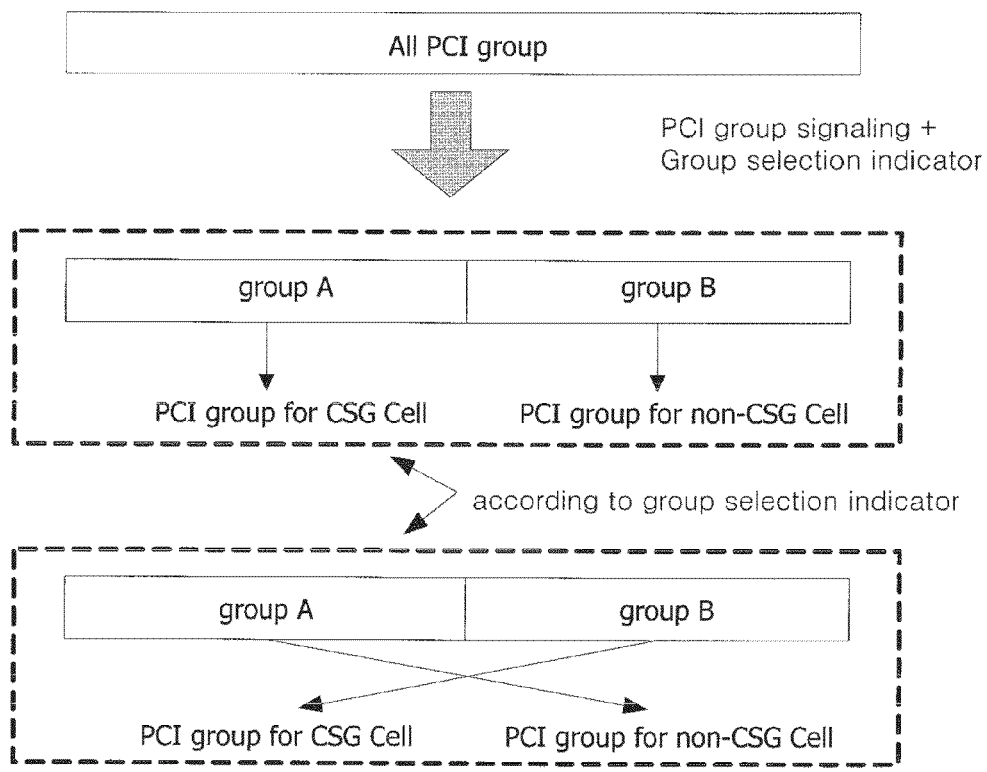
FIG. 7 is an exemplary view of utilizing a group selection indicator according to a present invention after dividing a physical cell identity (PCI) group into two different physical cell identity (PCI) groups.

FIG. 7 is an exemplary view of utilizing a group selection indicator according to a present invention after dividing a physical cell identity (PCI) group into two different physical cell identity (PCI) groups;

As illustrated in FIG. 7, all PCI group are divided into two different groups by the PCI group signaling. After the all PCI group is divided into two groups, according to a group selection indicator, the UE may determine which radio resource group will be used for a CSG cell and which radio resource group will be used for a non-CSG cell. Here, the group selection indicator may have a value from two values of 'CSG only' and 'Non-CSG only'. Each group may include the group selection indicator, and a default purpose will be applied for a certain group if the group selection indicator is not included in the certain group. For example, if the default purpose is set as 'non-CSG cell' and a purpose of 'group B' will be used for a PCI group for CSG cell, then the 'group B' may include the group selection indicator indicating 'CSG only' and the 'group A' may include the group selection indicator indicating 'Non-CSG only' or may not include the group selection indicator.

The following is an exemplary operation between UE and network in order to achieve the purpose of the present invention.

First, in a first step, a UE (terminal) may receive information relating to each PCI group from a network (base station). Then, as a second step, the network may also transmit a basic purpose of random PCI group. Here, the second step may be concurrently performed with the first step. In some case, the basic purpose of random PCI group may be defined in early stage between the UE and network, in such situation, the network may not need to transmit such information to the UE. As a third step, the network may transmit a group selection indicator to the UE. Here, the third step may be concurrently performed with the first step or the second step. The group selection indicator may be transmitted to each group, may be only transmitted to partial group(s), or may not be transmitted to certain group(s). The UE may know which PCI is included in each PCI group by receiving the information relating to each PCI group through the first step. Also, the UE may know a purpose of each PCI group by receiving the group selection indicator through the third step. Here, if the group selection indicator is not included in certain group(s), a default purpose will be applied for the certain group(s).

Figure 8:
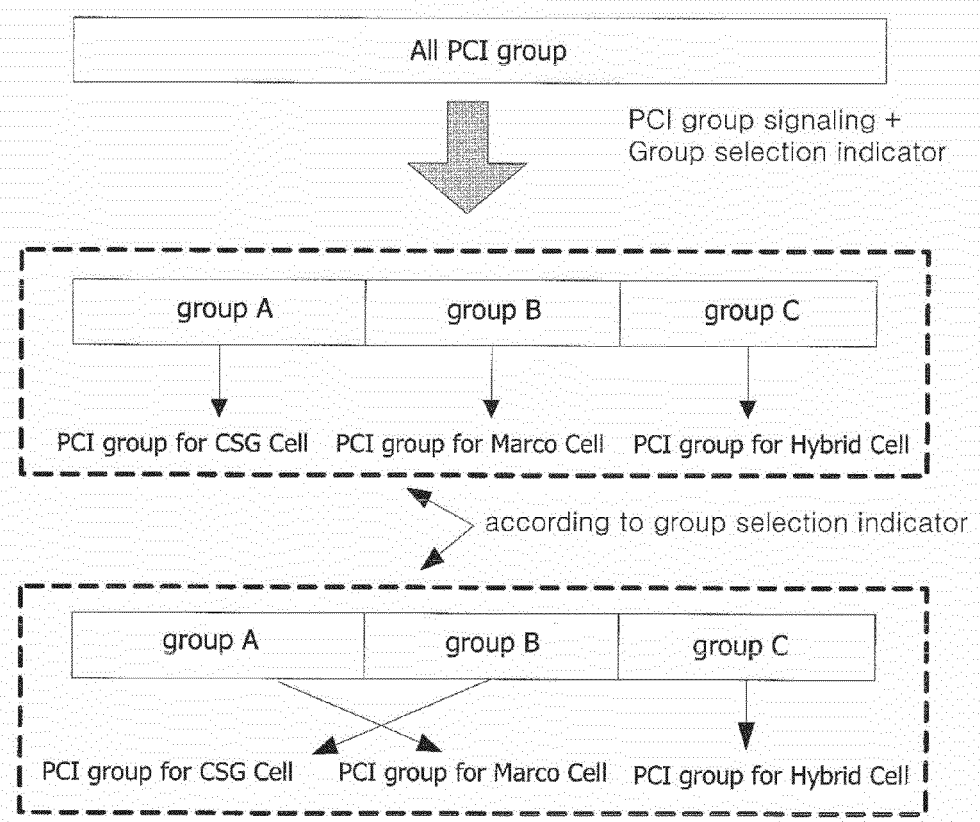
FIG. 8 is an exemplary view of utilizing a group selection indicator according to the present invention after dividing a physical cell identity (PCI) group into three different physical cell identity (PCI) groups.

FIG. 8 is an exemplary view of utilizing a group selection indicator according to the present invention after dividing a physical cell identity (PCI) group into three different physical cell identity (PCI) groups.

As illustrated in FIG. 8, all PCI group are divided into three different groups by the PCI group signaling. After the all PCI group is divided into three groups, according to a group selection indicator, the UE may determine which radio resource group will be used for a CSG cell, which radio resource group will be used for a Macro cell, and which radio resource group will be used for a Hybrid cell. Here, the group selection indicator may have a value from three values of 'CSG cell', 'Macro cell' and 'Hybrid cell'. Each group may include the group selection indicator, and a default purpose will be applied for a certain group if the group selection indicator is not included in the certain group. As all steps for FIG. 8 is very similar to the steps of the FIG. 7, the detailed description for the FIG. 8 will be omitted.

Figure 9:
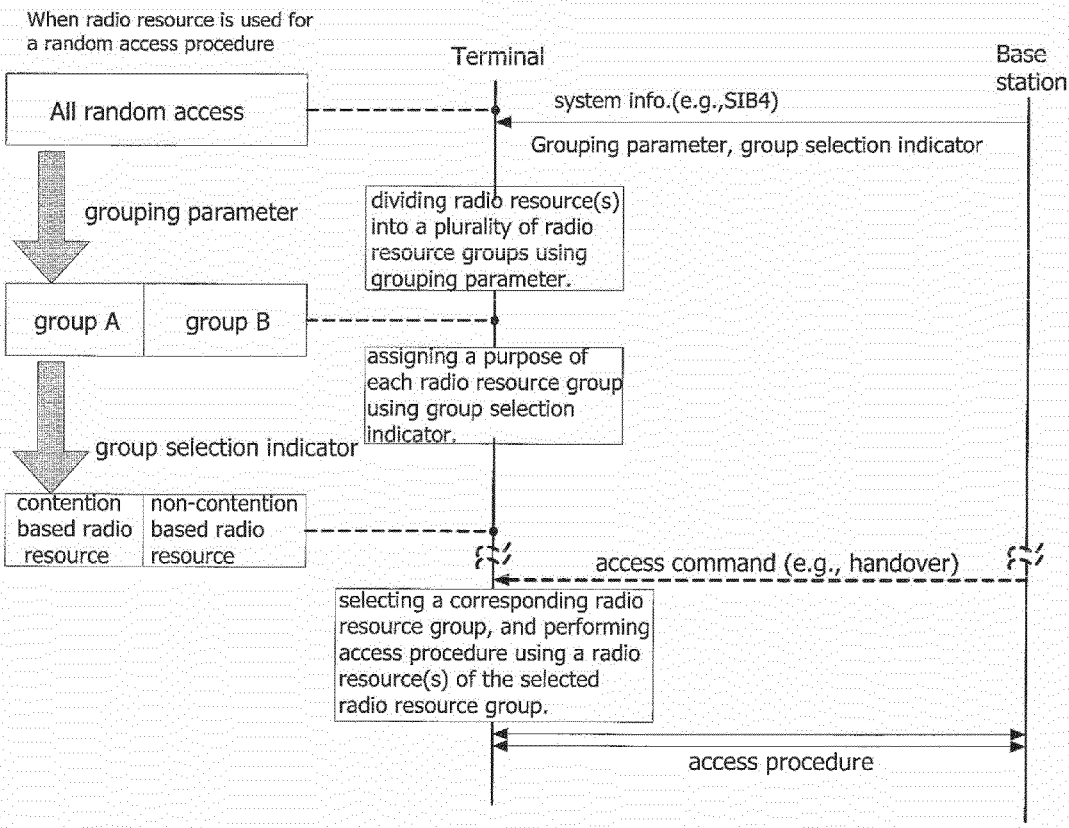
FIG. 9 is an exemplary view illustrating a data signaling between a terminal and a base station according to the present invention when radio resource(s) is used for a random access procedure.

FIG. 9 is an exemplary view illustrating a data signaling between a terminal and a base station according to the present invention when radio resource(s) is used for a random access procedure.

First, the UE (terminal) may receive system information including grouping parameter(s) and group selection indicator(s) from the network (base station). Here, the system information may be received through various control channels such as a broadcast control channel (BCCH). Also, the grouping parameter(s) and the group selection indicator(s) may be received through a system information block 4 (SIB 4). Thereafter, the UE may divide radio resource(s) into a plurality of groups using the received grouping parameter. Further, a purpose of each radio resource group can be assigned by using the received group selection indicator. Here, if the radio resource is used for a random access procedure, a first radio resource group (group A) may be used only for a contention based random access and a second radio resource group (group B) may be used only for a non-contention based random access. After the purpose of the each radio resource group is assigned or allocated, the UE may receive an access command (e.g., handover), after receiving the access command or regardless of the access command reception, the UE may select a suitable radio resource group for accessing to the network, and may perform the access procedure with the network using radio resource(s) of the selected radio resource group.

Figure 10:
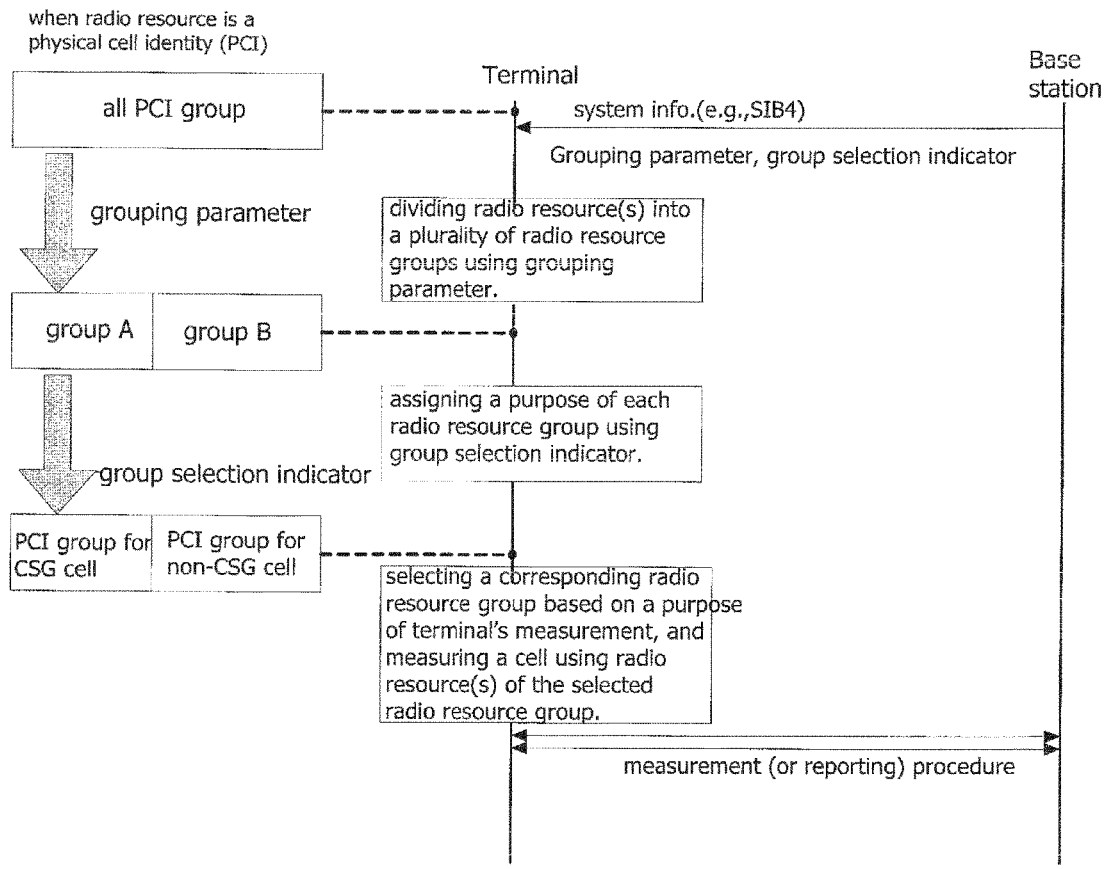
FIG. 10 is an exemplary view illustrating a data signaling between a terminal and a base station according to the present invention when radio resource(s) is a physical cell identity (PCI).

FIG. 10 is an exemplary view illustrating a data signaling between a terminal and a base station according to the present invention when radio resource(s) is a physical cell identity (PCI).

First, the UE (terminal) may receive system information including grouping parameter(s) and group selection indicator(s) from the network (base station). Here, the system information may be received through various control channels such as a broadcast control channel (BCCH). Also, the grouping parameter(s) and the group selection indicator(s) may be received through a system information block 4 (SIB 4). Thereafter, the UE may divide radio resource(s) into a plurality of groups using the received grouping parameter. Further, a purpose of each radio resource group can be assigned by using the received group selection indicator. Here, if the radio resource is related with a physical cell identity, a first radio resource group (group A) may be used only for CSG (closed subscriber group) cell and a second radio resource group (group B) may be used only for a non-CSG cell. Thereafter, the UE may select a suitable radio resource group according to a measurement purpose, and then may measure a cell, which uses radio resource(s) of the selected radio resource group. Namely, the UE may only consider the PCI group assigned for the non-CSG cell if the UE does not support a CSG cell, and the UE may only consider the PCI group assigned for the CSG cell if the UE supports the CSG cell.

The present invention may provide a method of managing a radio resource in wireless communication system, the method comprising: receiving a grouping parameter and a group selection indicator from a network, wherein the grouping parameter is used to form radio resource groups; selecting at least one radio resource group among the radio resource groups based on the group selection indicator; selecting at least one radio resource from the at least one selected radio resource group; and accessing the network using the at least one selected radio resource or performing a measurement for a cell having the at least one selected radio resource, wherein the grouping parameter and the group selection indicator are included in a system information block (SIB) transmitted from the network, the at least one radio resource is related to a physical cell identity (PCI) or a physical scrambling code (PSC), the grouping parameter is used to form at least a first radio resource group and a second radio resource group, and each radio resource allocated into the first and second radio resource group has different intend of use respectively.

It can be also said that the present invention may provide a method of managing a radio resource in wireless communication system, the method comprising: receiving a grouping parameter and a group selection indicator from a network, wherein the grouping parameter is used for grouping radio resources; and grouping radio resources into at least a first radio resource group and a second radio resource group based on the grouping parameter, wherein the first radio resource group is used to allocate radio resources for at least a first purpose and the second radio resource group is used to allocate radio resources for at least a second purpose that is different from the first purpose, and wherein the group selection indicator allows the first radio resource group to be used to allocate the radio resources for the second purpose and allows the second radio resource group to be used to allocate the radio resources for the first purpose, wherein the first purpose is for a closed subscriber group (CSG) cell and the second purpose is for a non-closed subscriber group (non-CSG) cell, the radio resources are further grouped into a third radio resource group, the third radio resource group is used to allocate radio resources for at least a third purpose that is different from the first and second purpose, and the third purpose is for a hybrid cell.

Also, the present invention may provide a method of managing a radio resource in wireless communication system, the method comprising: generating a grouping parameter and a group selection indicator, wherein the grouping parameter is used to form radio resource groups; and transmitting the grouping parameter and group selection indicator to a terminal, wherein the group selection indicator is used to select a radio resource group among the radio resource groups, wherein at least one radio resource is selected from the radio resource group, and wherein the selected at least one radio resource is used for communicating with the terminal.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of managing a radio resource in wireless communication system, the method comprising:
   receiving a grouping parameter and a group selection indicator from a network, wherein the grouping parameter is used to form at least a first radio resource group and a second radio resource group;
   selecting at least one radio resource group among the at least first and second radio resource groups based on the group selection indicator,
   wherein each of at least one radio resource from the at least first and second radio resource groups has a different intended use;
   selecting at least one radio resource from the at least one selected radio resource group; and
   accessing the network using the at least one selected radio resource or performing a measurement for a cell having the at least one selected radio resource.

2. The method of claim 1, wherein the grouping parameter and the group selection indicator are included in a system information block (SIB) transmitted from the network.

3. The method of claim 1, wherein the at least one radio resource is related to a physical cell identity (PCI) or a physical scrambling code (PSC).

4. A method of managing a radio resource in wireless communication system, the method comprising:

receiving a grouping parameter and a group selection indicator from a network, wherein the grouping parameter is used for grouping radio resources; and grouping radio resources into at least a first radio resource group and a second radio resource group based on the grouping parameter, wherein the first radio resource group is used to allocate radio resources for at least a first purpose and the second radio resource group is used to allocate radio resources for at least a second purpose that is different from the first purpose, and wherein the group selection indicator allows the first radio resource group to be used to allocate the radio resources for the second purpose and allows the second radio resource group to be used to allocate the radio resources for the first purpose.

5. The method of claim 4, wherein the first purpose is for a closed subscriber group (CSG) cell and the second purpose is for a non-closed subscriber group (non-CSG) cell.

6. The method of claim 4, wherein the radio resources are further grouped into a third radio resource group.

7. The method of claim 6, wherein the third radio resource group is used to allocate radio resources for at least a third purpose that is different from the first and second purpose.

8. The method of claim 7, wherein the third purpose is for a hybrid cell.

9. A method of managing a radio resource in wireless communication system, the method comprising:

generating a grouping parameter and a group selection indicator, wherein the grouping parameter is used to form at least a first radio resource group and a second radio resource group; and transmitting the grouping parameter and group selection indicator to a terminal, wherein the group selection indicator is used to select a radio resource group among the at least first and second radio resource groups, wherein each of at least one radio resource from the at least first and second radio resource groups has a different intended use, wherein at least one radio resource is selected from the selected radio resource group, and wherein the selected at least one radio resource is used for communicating with the terminal.

* * * * *